F. A. SAWYER, 2d.
Carriage-Step.
No. 210,470.  Patented Dec. 3, 1878.
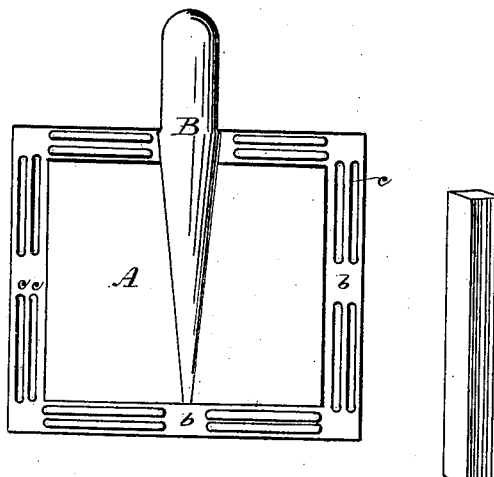
Fig. 2.
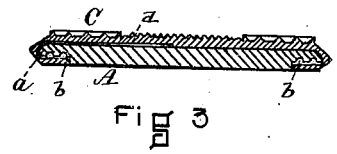
Fig. 3.
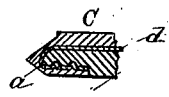
Fig. 4.
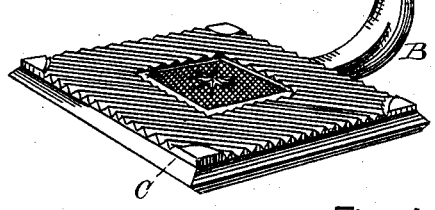
Fig. 1.
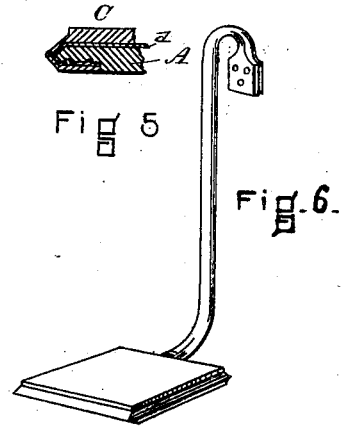
Fig. 5.
Fig. 6.
WITNESSES.
F. F. Raymond 2d
Frank G. Parker
Francis A Sawyer 2d
INVENTOR

UNITED STATES PATENT OFFICE.

FRANCIS A. SAWYER, 2D, OF BOSTON, MASSACHUSETTS, ASSIGNOR TO RUBBER STEP MANUFACTURING COMPANY, OF SAME PLACE.

IMPROVEMENT IN CARRIAGE-STEPS.

Specification forming part of Letters Patent No. 210,470, dated December 3, 1878; application filed September 27, 1877.

*To all whom it may concern:*

Be it known that I, F. A. SAWYER, 2d, of Boston, in the county of Suffolk and State of Massachusetts, have invented an Improvement in Carriage Steps and Shanks, of which the following is a specification:

This invention has for its object the following-described carriage step and shank, the nature of which I will explain by the aid of the accompanying drawing, in which—

Figure 1 is a perspective view of the step and shank. Fig. 2 is a plan of the bottom of the shank and pad as it is prepared to receive a rubber plating. Fig. 3 is a cross-section of the completed step; and Figs. 4 and 5 are detail views. Fig. 6 is a perspective view, in outline, of a carriage-step in which the shank is adapted to be fastened directly to a carriage.

The metal pad A and the elongated shank B are forged in one piece, and the pad is plated with rubber C. The shank may be curved, as shown in Fig. 1, or it may be straight, to be shaped when used. I prefer, however, to curve the shank before molding the rubber covering to the pad, as I can use a cheaper but just as desirable grade of iron.

The pad A is beveled or rounded from its upper surface along its edge at *a*, and is recessed on its under surface from the edge inwardly at *b*. The outer portion of the pad, beveled at its edge and recessed underneath, as described, may have formed on its under surface in the recess the grooves or indentations *c*, arranged perfectly parallel with the edges of the pad, though not continuously around it.

At the front edge of the plate, on the upper surface and in the recess, and around the shank at its junction with the plate, and at other places on the edge or surface of the plate where it is desirable to strengthen the attachment of the rubber to the plate and knit the rubber together, I place strips of canvas *d*, or other fibrous material, over which the rubber is molded, and to which and the iron pad the rubber is united by heat and pressure so that the vulcanized-rubber covering is plated over the entire upper surface of the metal pad and canvas, projecting slightly at the edges, covering the same, lapping into and filling the recess beneath, and compressing the canvas into the grooves or indentations.

To fasten this step to a carriage, the end of the shank is welded to a short arm or bracket, which is provided with means for fastening it to a carriage.

By making the shank of moderate length, the welding can be effected without injury to the rubber plating by simply covering the same during the operation with wet or damp cloths.

The edge of the plate being beveled, as described, provides a support for the lateral or oblique thrust of the rubber in the use of the step in mounting to or descending from a carriage, and is an improvement over the straight or vertical edge, as the thrust is received by the rubber substantially at right angles to the slope of the support, while with a vertical edge there is no support for the projecting rubber, which in time will be torn therefrom on the line of the sharp upper edge of the metal plate if the treading-surface of the rubber is not extended laterally beyond the edge of the pad.

The canvas may be in one piece and lap over the edge of the plate into the recess; or it may be in two or more pieces, arranged above the plate at its edge and below it in the recess. The use of the canvas in this way greatly strengthens the adherence of the rubber to the pad, and as the rubber is firmly vulcanized to the canvas it will not give or tear away from the plate without also tearing or displacing the canvas. It also acts as a re-enforce at the edge of the plate, and the upper and under piece, being united by vulcanized rubber, bite the edge of the plate, as it were, and prevent the rubber from yielding at the edge, while it strengthens it.

The rubber is thoroughly incorporated into the fiber of the canvas in the acts of molding and vulcanizing, particularly at the projecting edge, which is very securely knit thereto and strengthened.

I prefer to use cast-steel or wrought-iron in fashioning the shank and pad.

The shank is finished, or partly finished; but the pad is in an unfinished state until covered by a finishing plating of resilient rubber vulcanized thereto.

It will be observed that by this construction it is not necessary to finish the metal pad after forging by trimming its edges, polishing, and painting the same, as is now essential in finishing the plain iron or steel pad for the market; but that the finishing-plating of rubber can be applied to the metal pad directly its leaving the mold or the forge, thus saving a greater expense in finishing than the cost of the rubber plating.

It will further be seen that I am not obliged to shape and adapt the pad to the end of the shank, as was requisite in fitting a detachable pad to the bracket, as set forth in the Keene reissue and in later patents, and that a material economy in the manufacture is thereby effected.

Heretofore in making shanks and steps covered with a plating of rubber vulcanized thereon, as an article of trade, it was thought necessary to make the rubber-covered pad detachable from the shank, in order that the rubber might not be charred while the shank was being welded to the arm or bracket by which it was fastened to the carriage; but I have discovered that by making the shank a little longer than I would in the other instance, and by the application of damp or wet cloths to the rubber, I am enabled to weld the shank to the detachable arm with the rubber and pad rigidly fixed at the end, thereby causing a firmer step and making an economy in construction, as a detachable pad has to be fitted to the end of a shank particularly shaped to receive it, and then locked thereon by keying, bolting, or wedging. I avoid an expensive and cumbersome process and a multiplicity of parts.

It will be observed that the portion of the shank near the pad is substantially finished, and that the end is unfinished and of a shape desirable for welding purposes.

When the finest quality of iron is used the shank may not be curved till it is attached to the arm or bracket; but if a poorer grade is used it is necessary to curve the same before the rubber is applied to the pad, as the shank would have to be heated so near the rubber that there would be great danger of charring or burning it, and it is very often necessary to curve the shank near the pad.

I am aware that the patent to F. B. Morse, granted March 22, 1870, No. 101,150, shows and describes a new article of manufacture consisting of an embossed metal carriage-step and a rod for the purpose of welding; also, that the patent granted Charles H. Gould, May 30, 1876, Reissue No. 7,147, claims and describes the combination of an india-rubber or equivalent elastic shield, top, or surface with a sheet or disk of fibrous material forming the body or back thereof for a flexible elastic shield for car and other steps; also, that the patent granted G. A. Keene, February 11, 1873, No. 135,815, describes a means for fastening a foot-pad of rubber vulcanized over a thin metal plate and projecting from its edge to a step-tread; but neither the metal step of Morse, the flexible shield of Gould, nor the detachable pad of Keene contain the elements of my invention or any part thereof.

I am also aware that the Reissue Letters Patent No. 6,229, granted to Geo. A. Keene, assignor to the Rubber Step Manufacturing Company, describes and claims the combination of a bracket or arm projecting from a carriage, a metallic plate, and a plating of resilient rubber; but as said rubber has always been vulcanized to the metal pad or plate before the same is fastened to the shank projecting from the carriage and forming a part thereof, and as the shank is not described as finished, or partly finished, for the purpose I set forth, but is described as a part of the carriage, shaped and fastened thereto before the rubber-covered pad is applied, and as the pad requires the use of the fastenings $e$ to attach it to the arm or bracket, I do not consider the same to embrace the particular invention herein described and claimed.

I claim—

1. In a carriage-step, the metal pad described, beveled or rounded along its upper edge, recessed inwardly from the lower edge, and with or without the grooves or indentations $c$, for the purpose set forth.

2. In an elastic carriage-step, the combination of a metal pad, a resilient plating of rubber and fibrous re-enforcing material arranged between said rubber and pad, to be entirely inclosed by said rubber and protected from the action of the weather, as described, all united by vulcanization under pressure, as set forth.

3. In an elastic carriage-step, the combination of a metal pad beveled or rounded along its upper edge with a rubber plating beveled or rounded at its edge, substantially coincident with the bevel or curvature of the plate, as and for the purpose described.

4. An elastic carriage-step consisting of a metal pad completely plated with rubber on its upper surface and edge, having the tread or flat upper surface of rubber not extended beyond the edge of the plate, and molded thereon by vulcanization, substantially as described.

FRANCIS A. SAWYER, 2D.

Witnesses:
F. F. RAYMOND, 2d,
THOS. WM. CLARKE.